(12) United States Patent
Adkins et al.

(10) Patent No.: US 7,353,651 B2
(45) Date of Patent: Apr. 8, 2008

(54) DE-STROKING DUAL HYDROSTATIC PUMP

(75) Inventors: Brian Matthew Adkins, Apex, NC (US); Kevin Patrick Lund, Apex, NC (US)

(73) Assignee: Deere & Company, Moline, IL (US)

( * ) Notice: Subject to any disclaimer, the term of this patent is extended or adjusted under 35 U.S.C. 154(b) by 264 days.

(21) Appl. No.: 11/232,653

(22) Filed: Sep. 22, 2005

(65) Prior Publication Data

US 2007/0068711 A1 Mar. 29, 2007

(51) Int. Cl.
*F16D 31/02* (2006.01)
(52) U.S. Cl. .............................. 60/449; 60/391; 60/486
(58) Field of Classification Search .................. 60/391, 60/449, 484, 486; 91/506; 92/13
See application file for complete search history.

(56) References Cited

U.S. PATENT DOCUMENTS

| | | | |
|---|---|---|---|
| 3,459,273 A | 8/1969 | Leinhauser et al. | 180/6.48 |
| 3,500,633 A * | 3/1970 | Livezey | 60/449 |
| 3,823,650 A | 7/1974 | Ring et al. | 91/497 |
| 3,898,811 A * | 8/1975 | Seaberg | 60/431 |
| 4,589,249 A | 5/1986 | Walker et al. | 56/16.6 |
| 6,161,637 A | 12/2000 | Decker et al. | 180/6.48 |
| 6,935,106 B2 * | 8/2005 | Korthals | 60/487 |

* cited by examiner

*Primary Examiner*—Michael Leslie

(57) ABSTRACT

A zero turning radius mower has a dual hydrostatic pump with right and left pump arms. A linkage between the pump arms and a pair of control levers destrokes both sides of the pump simultaneously if engine speed drops below a specified value. The linkage allows each pump arm to have a first stroke range if the engine powering the pump is above the specified value, and a second smaller stroke range if the engine powering the pump is below the specified value.

12 Claims, 7 Drawing Sheets

DE-STROKING DUAL HYDROSTATIC PUMP

FIELD OF THE INVENTION

This invention relates to grass mowing machines, and specifically to zero turning radius (ZTR) mowing machines having independently powered left and right drive wheels controlled by a twin stick control system.

BACKGROUND OF THE INVENTION

Grass mowing machines known as ZTR mowers have at least one independently powered drive wheel on each side of a frame. One drive wheel may be operated in a forward direction while the other drive wheel may be stopped or operated in reverse. Many ZTR mowers have a twin stick control system. Two control handles or sticks may be provided side-by-side, with each control handle or stick controlling one of the drive wheels. When both control handles or sticks are advanced together forwardly out of their neutral position, both drive wheels rotate forwardly to cause the mower to move forward. A ZTR mower may be steered by advancing one control handle or stick more than the other.

Typically, each control handle or stick on a ZTR mower may be linked to a pump arm of one of two separate hydraulic pumps, or of a dual hydraulic pump; i.e, a separate pump for each wheel. The control handle or stick may be used to move a pump swashplate through a direct linkage. For example, 10 degrees of operator input at the pump arm may yield 10 degrees of pump stroke.

ZTR mowers may be capable of operating at high ground speeds and mowing large amounts of grass while at high speeds. However, difficult mowing conditions may load the ZTR mower and cutting blades heavily enough to slow or even stall the engine if the operator does not reduce the ground speed. Such difficult mowing conditions may include very tall, wet, dense grass. Typically, the engine may strain and its speed may drop below a desired range. If the engine speed drops substantially, the rotational speed of the cutting blades also may drop below an optimal range, i.e., below a desired range of between about 2000 and about 2500 rpm. If the cutting blades rotate at speeds below their optimal range, the ZTR mower may provide poor or unacceptable cut quality.

In an attempt to maintain rotation of cutting blades at acceptable speeds, some ZTR mower operators may listen to the engine. If they notice the engine is straining, they may pull back on both control handles or sticks to slow the mower's forward speed and thereby reduce the engine load imposed to move the mower forward or in reverse. This can have the effect of allowing engine speed to increase back to its normal operating range which also speeds up the cutting blades. However, some operators do not slow the mower for adverse mowing conditions, but instead push both control handles or sticks all the way forward and leave them there during mowing, even if engine speed drops and cutting blades slow down. This can lead to poor cut quality under the conditions described above.

Some ZTR mowers may have mechanical or electrical controls that limit how far the control handles or sticks may be pushed forward during mowing. The controls may be set to a desired travel speed, or to a maximum travel speed. For example, U.S. Pat. No. 6,161,637 relates to a twin stick control system that the operator may preset to a travel speed, and also may be speeded up and automatically returned later to same preset speed. However, this speed control system does not reduce the travel speed in adverse mowing conditions so that the rotational speed of the cutting blades stays within the optimal range.

An apparatus is needed to automatically reduce the travel speed of a ZTR mower in heavy grass or other adverse mowing conditions. A ZTR mower is needed that will rotate the cutting blades within an optimal range even when the engine is straining.

SUMMARY OF THE INVENTION

A ZTR mower has a dual hydrostatic pump that provides hydraulic fluid independently to a pair of motors on drive wheels. Pump arms on the right and left sides of the dual hydrostatic pump each define a stroke between a neutral position, a full forward position, and a full rearward position. A linkage between each pump arm and a pivotable control lever may be moved to vary the ratio of the control lever movement to the stroke imposed on the right and left sides of the dual hydrostatic pump.

The linkage may be generally V-shaped and slidable between a first position wherein both sides of the dual hydrostatic pump are not de-stroked and a second position wherein both sides of the dual hydrostatic pump are de-stroked. The linkage may be infinitely variable to slide anywhere between the first and second positions. An engine speed sensor may be operatively connected to the linear actuator, the linear actuator moving the linkage based on sensed engine speed.

The linear actuator and linkage automatically reduces the maximum travel speed of the ZTR mower in heavy grass or other adverse mowing conditions. The linkage reduces the maximum achievable forward and rearward speeds by narrowing the stroke range for pump input without affecting the range of motion of the operator controls. The cutting blades can maintain rotation within an optimal range even when the engine is straining.

DESCRIPTION OF THE PREFERRED EMBODIMENT

The present invention may be used in a ZTR mower having at least one drive wheel on each side that is independently powered so that it may rotate independently of the other drive wheel. Each independent drive may include a separate hydrostatic drive motor coupled to each wheel. The pair of drive motors may be connected via hydraulic conduits to a dual hydrostatic pump; i.e, a separate pump for each wheel. Each side of the dual hydrostatic pump may have a swashplate that may define a pump stroke between a neutral position and a full forward position.

Figure 1:
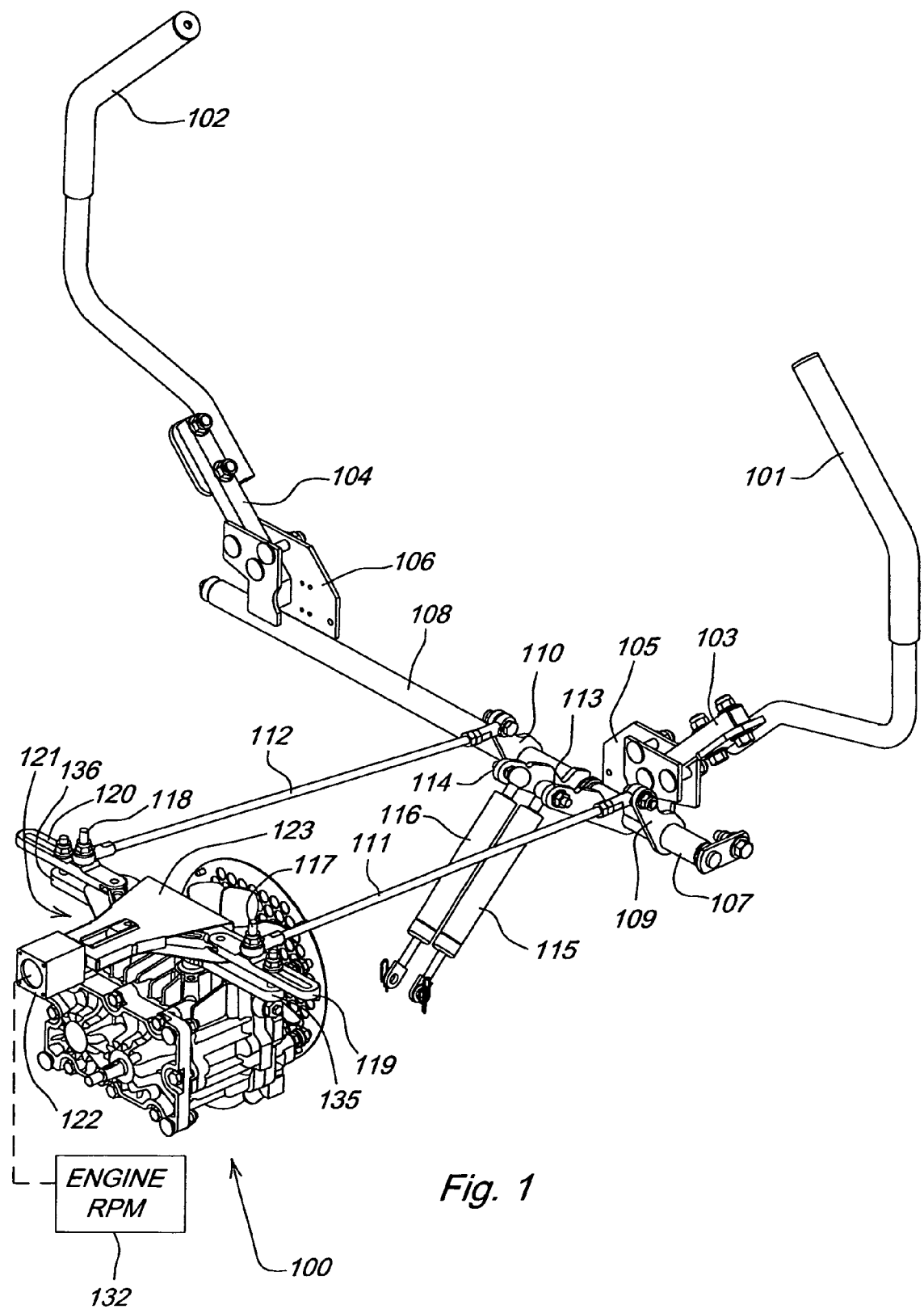
FIG. 1 is a perspective view of a control system for a ZTR mower that de-strokes a dual hydrostatic pump according to a first embodiment of the invention.

In a first embodiment shown in FIG. 1, dual hydrostatic pump 100 may be operated using right and left motion control levers or sticks 101, 102. Each lever or stick may pivot forwardly to move a swashplate in a hydrostatic pump in a first direction to cause a drive wheel to rotate forward, or pivot rearwardly to move the swashplate in a second direction to cause the drive wheel to rotate backward. The pair of motion control levers or sticks may be positioned next to one another in front of an operator's seat on a ZTR mower. The right motion control lever or stick 101 may be operatively connected to the right side of dual hydrostatic pump 100, and the left motion control lever or stick 102 may be operatively connected to the left side of the dual hydrostatic pump. Each motion control lever or stick may have a neutral position in which the corresponding drive wheel is at rest.

In one embodiment, the lower ends of the right and left motion control levers or sticks 101, 102 may be attached to the first or upper ends of right and left control arms 103, 104. The second or lower end of each control arm may be pivotably mounted to a bracket 105, 106 extending radially from a pivot tube 107, 108. The right and left pivot tubes 107, 108 may be coaxial and transverse to the longitudinal axis of the ZTR mower, generally in front of and below the operator's station. Each pivot tube may have a first bell crank 109, 110 secured thereto and extending radially therefrom, with the bell cranks connected to right and left steering linkages or rods 111, 112. Additionally, a damper and/or spring 115, 116 may be connected to a second bell crank 113, 114 on the pivot tube to urge the pivot tubes, and the motion control levers or sticks, toward a neutral position.

Figure 2:
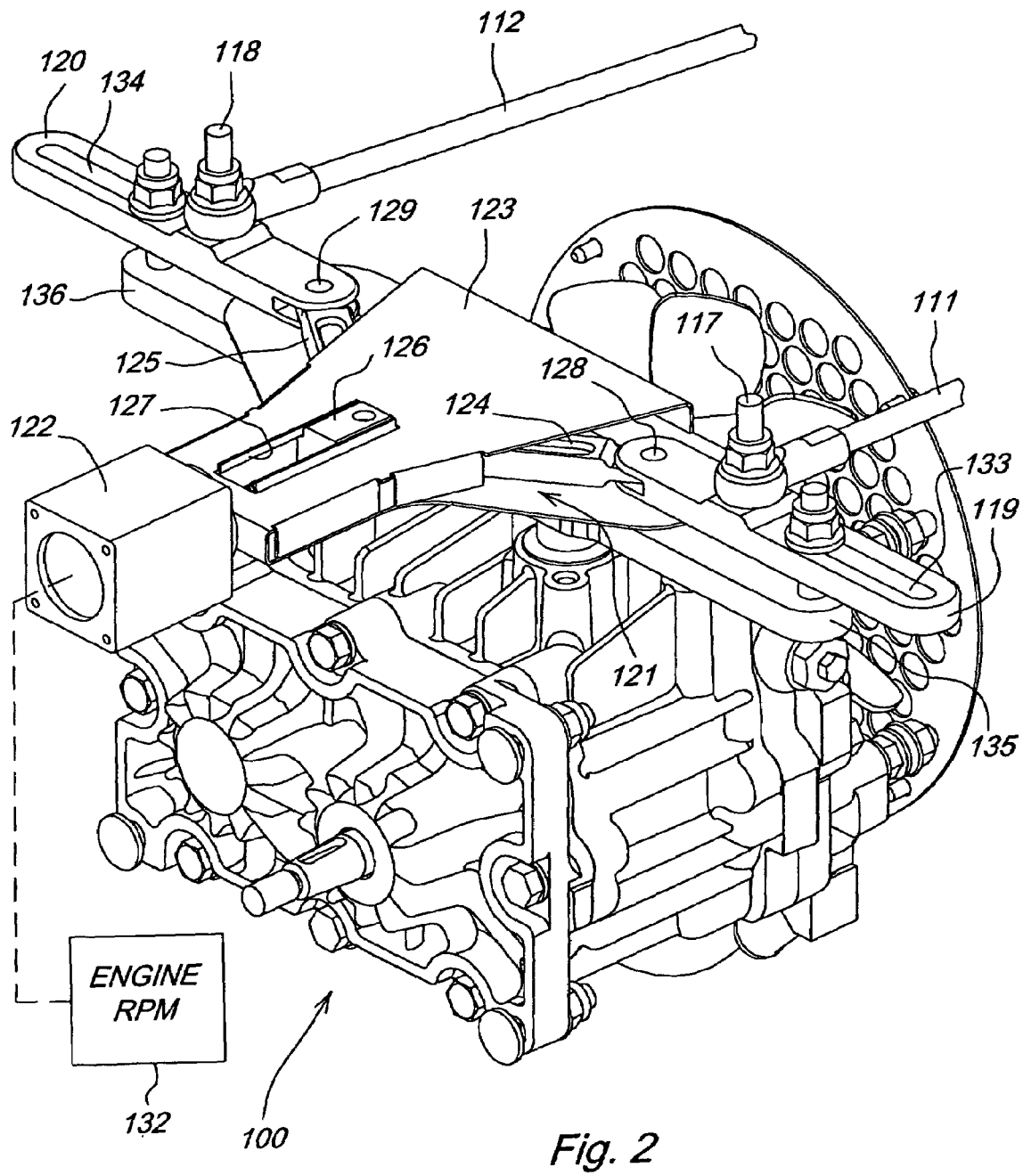
FIG. 2 is a perspective view of a first embodiment of an apparatus for de-stroking a dual hydrostatic pump.

Now referring to FIG. 2, in one embodiment, the right and left steering linkages or rods 111, 112 may extend between the first bell cranks 109, 110 and right and left laterally movable links 119, 120. The steering linkages or rods may attach to the laterally movable links at pivot points 117, 118 between the opposing ends of the laterally movable links. Each laterally movable link may cooperate with an input modulation linkage 121 and linear actuator 122 to increase or decrease the ratio of the operator's input stroke to the stroke imposed on dual hydrostatic pump 100.

Figure 3:
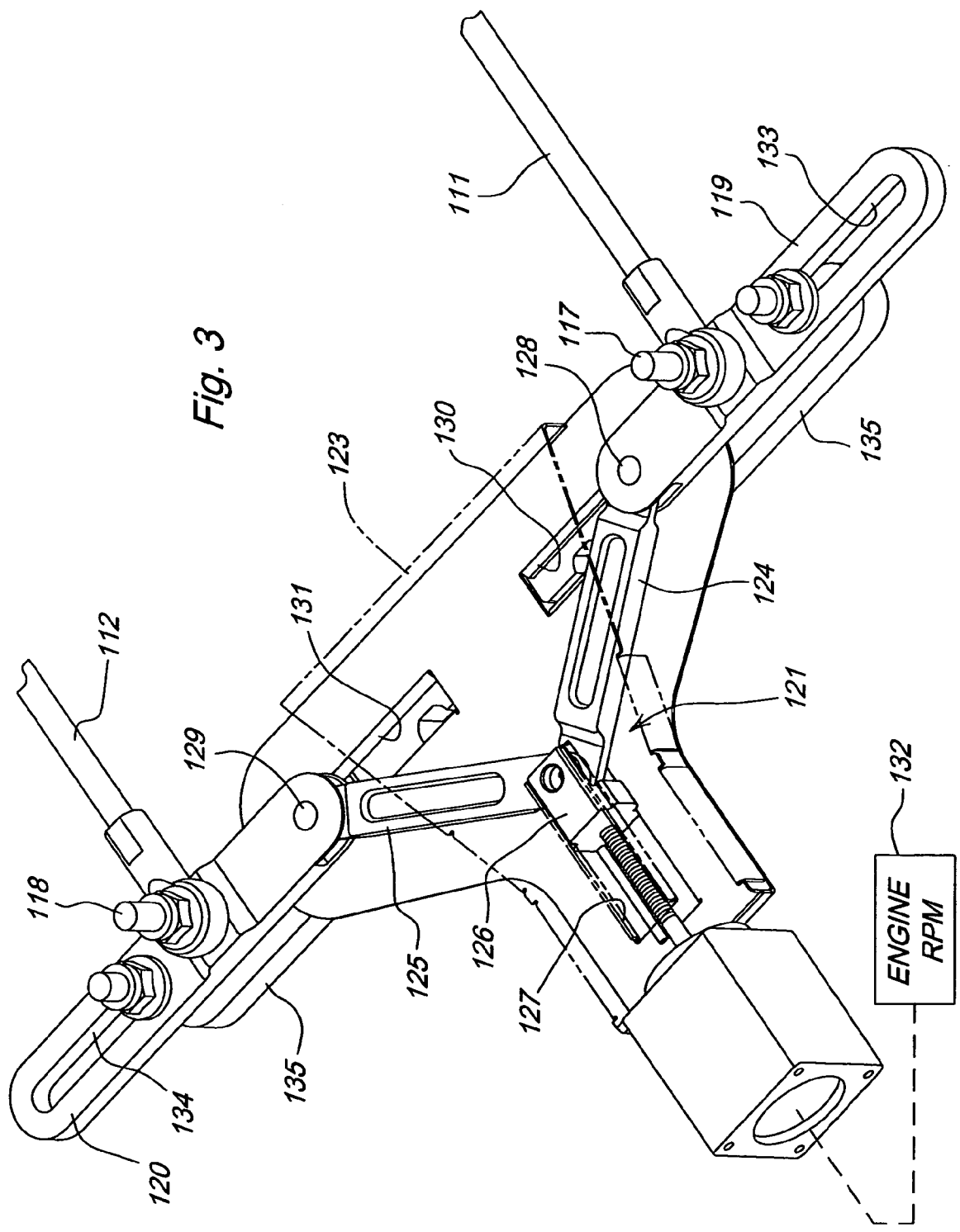
FIG. 3 is a perspective view of a linkage for de-stroking a dual hydrostatic pump according to the first embodiment.

In one embodiment shown in FIGS. 2 and 3, input modulation linkage 121 may be a V-shaped assembly mounted to move and/or slide in slots 127, 130 and 131 in actuator mounting plate 123. The input modulation linkage may move in response to detection of a pre-specified drop in engine speed. The V-shaped assembly of the input modulation linkage may include right and left legs 124, 125. The first ends of legs 124, 125 may be connected together at connection point 126, which may be mounted to move or slide in longitudinal slot 127 in the actuator mounting plate. The second ends of legs 124, 125 may be connected to laterally movable links 119, 120 at connection points 128, 129, which are mounted to move or slide in lateral slots 130, 131 in the actuator mounting plate.

Figure 6:
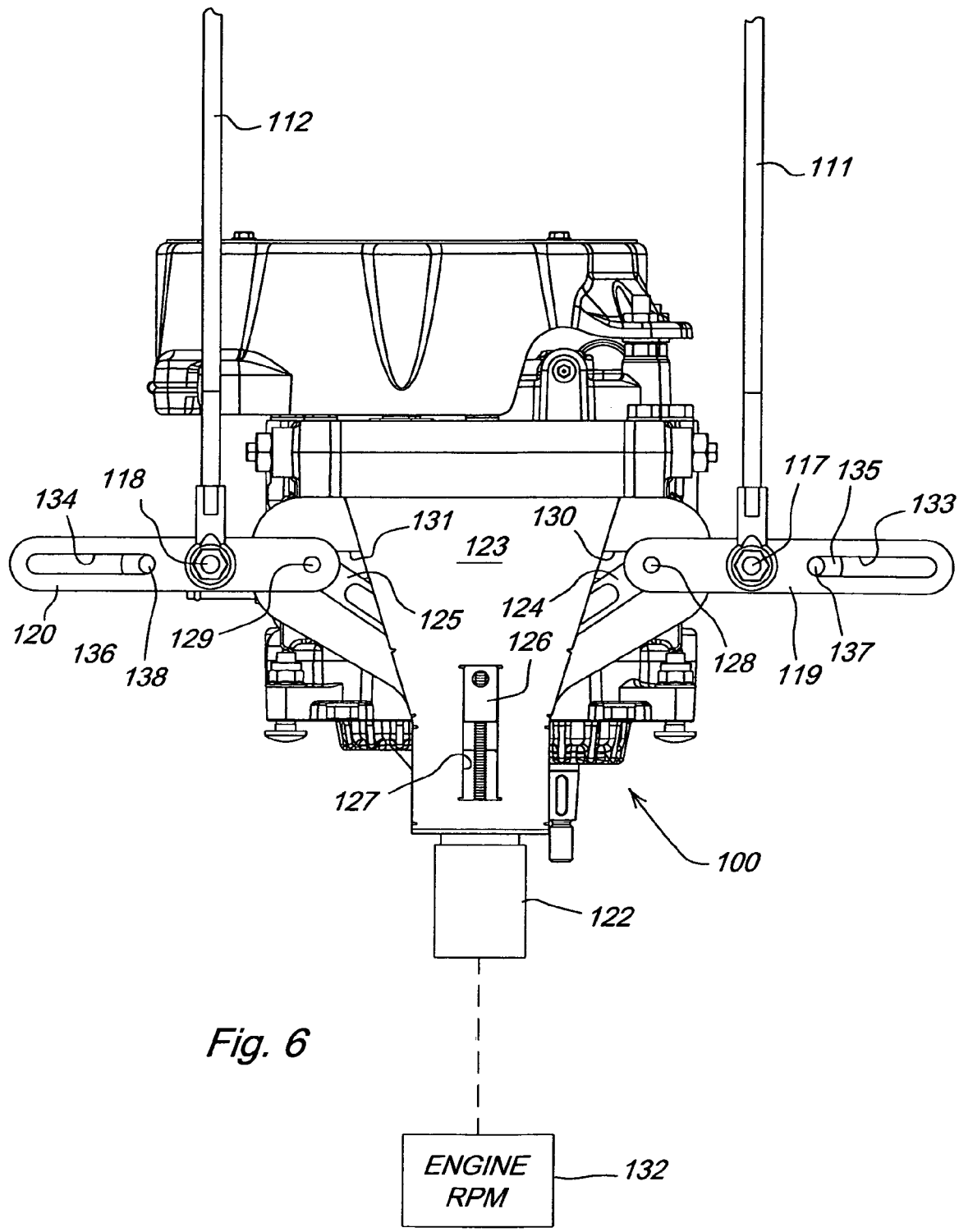
FIG. 6 is a top view of an apparatus for de-stroking a dual hydrostatic pump with the stroke reduced and both pumps in a neutral position.
Figure 7:
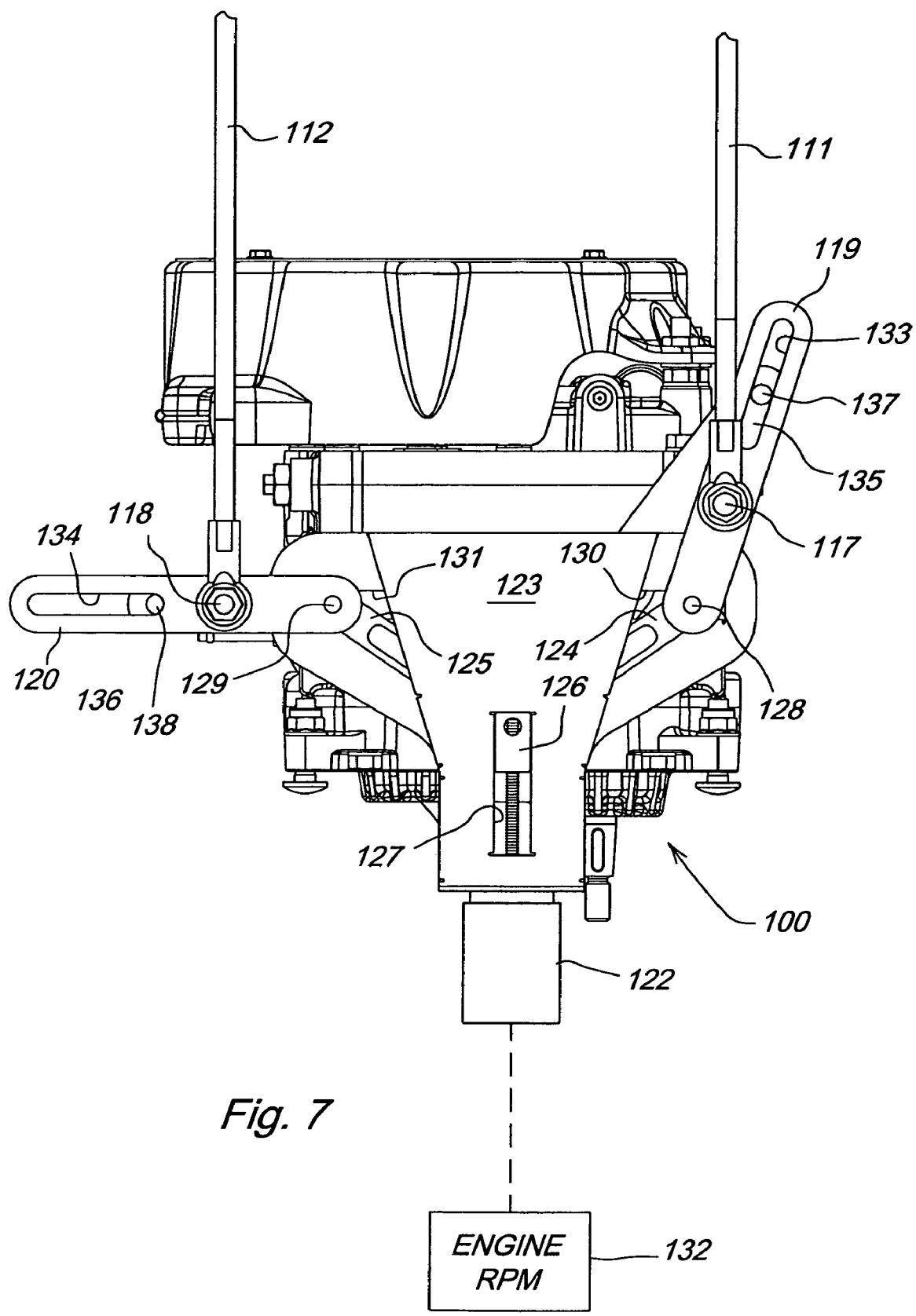
FIG. 7 is a top view of an apparatus for de-stroking a dual hydrostatic pump with the stroke reduced and one of the pumps in the full forward position.

In one embodiment, linear actuator 122 may be connected to engine speed monitor 132, such as an alternator that provides engine rpm. If sensed engine rpm is at or above a specified value, which will rotate the cutting blades at a speed within a desired range, linear actuator 122 may remain at a first position shown in FIGS. 4 and 5. However, if sensed engine speed drops below a specified rpm value, linear actuator 122 may move connection point 126 forward in slot 127. Forward movement of connection point 126 forces the second ends of legs 124, 125 to move laterally outwardly in slots 130, 131, as shown in FIGS. 6 and 7.

Figure 4:
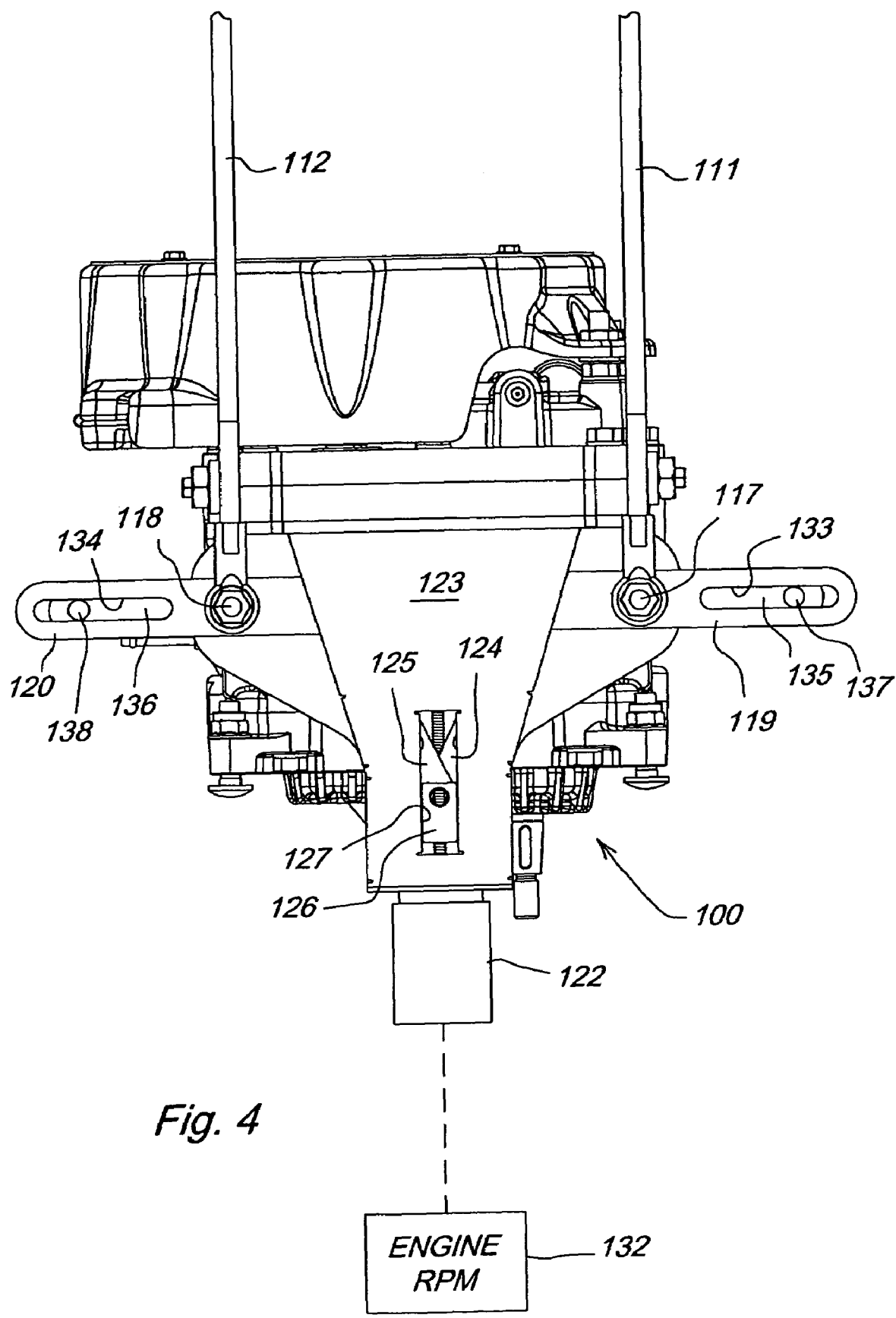
FIG. 4 is a top view of an apparatus for de-stroking a dual hydrostatic pump without the stroke reduced and both pumps in a neutral position.

Referring back to FIGS. 2 and 3, in one embodiment, the second ends of legs 124, 125 may be pivotably connected at connection points 128, 129 to the inner ends of laterally movable links 119, 120. As shown in FIG. 4, The outer ends of the laterally movable links may have slots 133, 134, and the left and right pump arms 135, 136 each may have a follower 137, 138 that slides within slots 133, 134. If the second ends of legs 124, 125 are moved laterally outwardly in slots 130, 131 due to low engine speed, links 119, 120 move laterally outwardly so that followers 137, 138 are closer to the inner ends of slots 133, 134. As a result, the stroke of both pump arms 135, 136 may be decreased. If engine speed decreases further below a specified rpm value, the second ends of legs 124, 125, and links 119, 120 may move laterally outwardly until followers 137, 138 reach the inner ends of slots 133, 134. The slots allow variable reduction in the stroke of both sides of the dual pump.

In one embodiment, as long as the engine speed is at or above a specified rpm value, pump stroke is not reduced. At or above the specified rpm value, followers 137, 138 may be at or near the outer ends of slots 133, 134.

If engine speed falls below a specified rpm value, pump stroke is reduced. Maximum reduction of pump stroke may be reached if engine speed reaches a value substantially below a specified rpm, in which case followers 137, 138 may be at the inner ends of slots 133, 134.

According to one embodiment, actuator 122 may move the input modulation linkage 121 to destroke both sides of the dual pump simultaneously. The ratio of the operator's input stroke on the control lever or stick to the stroke imposed on the hydraulic pump may be decreased from about 1:1 to about 1:0.5, for example.

Figure 5:
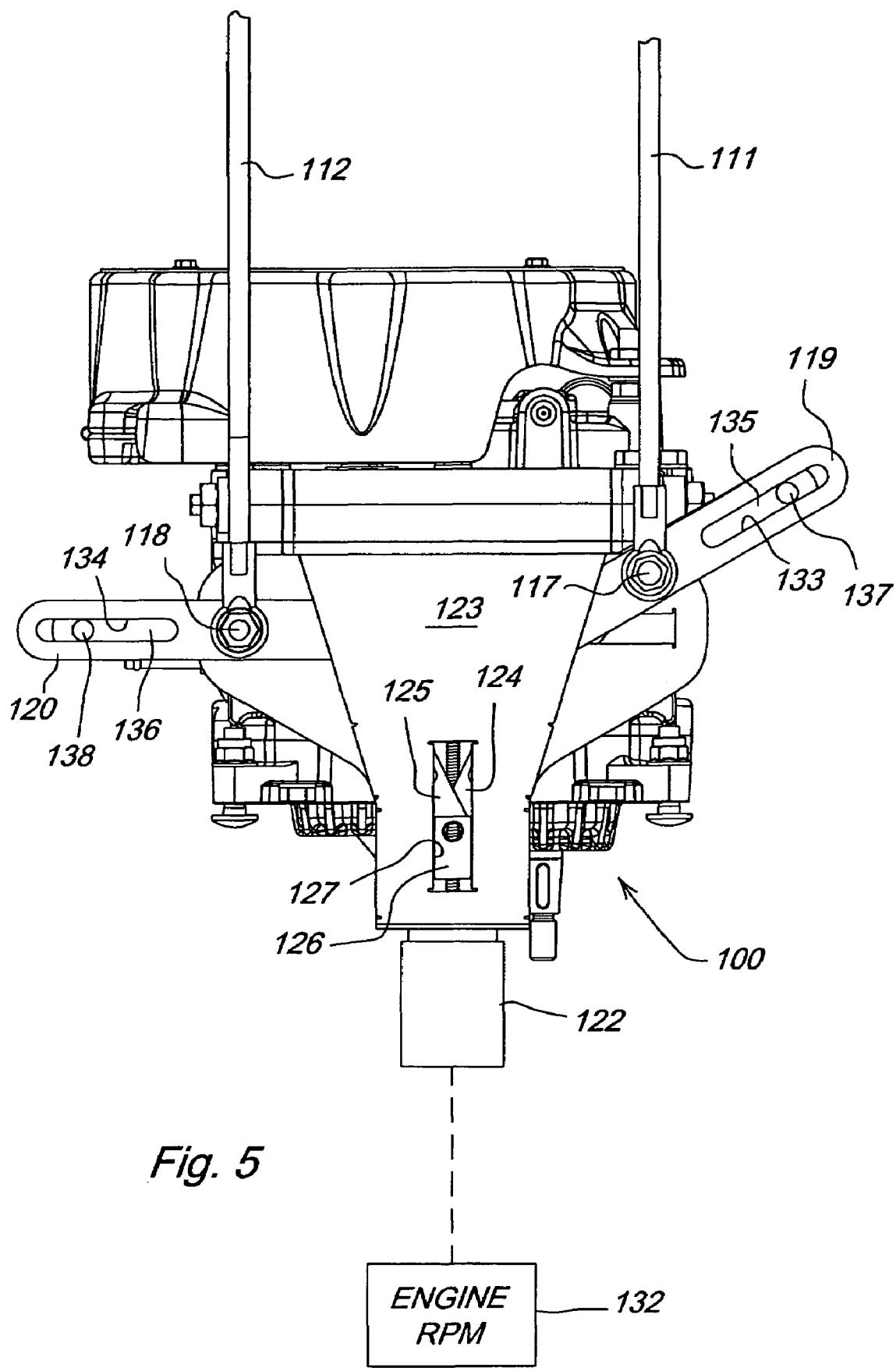
FIG. 5 is a top view of an apparatus for de-stroking a dual hydrostatic pump without the stroke reduced and one of the pumps in the full forward position.

FIGS. 4 and 5 show the input modulation linkage 121 in a first position wherein followers 137, 138 are near the outer ends of slots 133, 134. In FIG. 4, both steering linkages 111, 112 and pump arms 135, 136 are at a neutral position. In FIG. 5, the steering linkage 111 has been moved to a maximum speed position, while the steering linkage 112 remains at a neutral position. This causes a maximum stroke of pump arm 135 of about 20 degrees for forward travel. The maximum stroke for reverse travel may be limited to about 10 degrees, for example.

FIGS. 6 and 7 show input modulation linkage 121 in a second position wherein followers 137, 138 are at the inner ends of slots 133, 134. In FIG. 6, both steering linkages 111, 112 and pump arms 135, 136 are at a neutral position. In FIG. 7, steering linkage 111 has been moved (through the right control lever or stick) to a maximum forward speed position, while steering linkage 112 remains at a neutral position. This causes a maximum stroke of pump arm 135 for forward travel of about 10 degrees, for example, so that the maximum travel speed may be limited to about one-half of the maximum travel speed before de-stroking the pump.

Having described the preferred embodiment, it will become apparent that various modifications can be made without departing from the scope of the invention as defined in the accompanying claims.

The invention claimed is:

1. An apparatus comprising:
    a dual hydrostatic pump to provide hydraulic fluid independently to a pair of motors on drive wheels of a grass mowing machine;

a pump arm on the left and right sides of the dual hydrostatic pump, each pump arm defining a stroke between a neutral position and a full forward position;

an actuator mounting plate having a longitudinal slot and left and right lateral slots;

a left linkage between the left pump arm and a left pivotable control lever, the left linkage sliding in the left lateral slot;

a right linkage between the right pump arm and a right pivotable control lever, the right linkage sliding in the right lateral slot; and a linear actuator sliding in the longitudinal slot and moving the left and right linkages to vary the ratio of the control lever movement to the stroke imposed on the left and right sides of the dual hydrostatic pump.

2. The apparatus of claim 1 wherein the linkages are slidable in the lateral slots anywhere between a first position wherein both sides of the dual hydrostatic pump are not de-stroked and a second position wherein both sides of the dual hydrostatic pump are de-stroked.

3. The apparatus of claim 1 further comprising an engine speed sensor operatively connected to the linear actuator, the linear actuator moving the linkages based on sensed engine speed.

4. The apparatus of claim 3 wherein the linear actuator can move the linkages to a destroked position if sensed engine speed is lower than a specified value.

5. An apparatus comprising
a dual hydrostatic pump having left and right pump arms, each pump arm moving a separate swashplate;

left and right linkages between the left and right pump arms and left and right control levers; the linkages destroking both sides of the pump simultaneously if engine speed drops below a specified value; the linkages allowing each pump arm to have a first stroke range if the engine powering the pump is above the specified value, and a second smaller stroke range if the engine powering the pump is below the specified value; and an actuator mounting plate having a plurality of slots in which the linkages slide laterally in response to changes in engine speed.

6. The apparatus of claim 5 wherein the left and right linkages each have legs pivoting further apart if engine speed drops below the specified value.

7. The apparatus of claim 5 further comprising a linear actuator that slides in one of the slots in the actuator mounting plate to change the geometry of the linkages according to sensed engine speed.

8. An apparatus comprising:

a zero turning radius mower having a dual pump hydrostatic transmission and left and right motion control levers; each motion control lever pivotable in a first direction to drive a motor that rotates a drive wheel on the mower in a first direction, and pivotable in a second direction to drive the motor that rotates the drive wheel in a second direction; and a linkage that destrokes both sides of the dual pump simultaneously in response to decreased engine speed;

the linkage including a slotted actuator mounting plate in which a linear actuator connected to an engine speed sensor moves in a first slot in the plate in response to changes in engine speed, urging a left leg and a right leg of the linkage to move laterally in a second slot and a third slot in the plate.

9. The apparatus of claim 8 wherein the linkage destrokes both sides of the dual pump for forward travel and rearward travel.

10. The apparatus of claim 8 further comprising a damper to urge the motion control levers to neutral positions.

11. The apparatus of claim 8 wherein the linkage is slidable anywhere between a first position wherein both sides of the dual pump are not de-stroked, and a second position wherein both sides of the dual pump are de-stroked.

12. The apparatus of claim 8 wherein the motion control levers have the same range of motion if both sides of the dual pump are not de-stroked or if both sides are de-stroked.

* * * * *